(12) United States Patent
Ito

(10) Patent No.: US 7,046,395 B2
(45) Date of Patent: May 16, 2006

(54) IMAGE FORMING APPARATUS

(75) Inventor: Shinsaku Ito, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1056 days.

(21) Appl. No.: 10/025,962

(22) Filed: Dec. 26, 2001

(65) Prior Publication Data

US 2003/0117655 A1    Jun. 26, 2003

(51) Int. Cl.
*H04N 1/407* (2006.01)
*H04N 1/409* (2006.01)

(52) U.S. Cl. .................. 358/1.9; 358/2.1; 358/3.21; 358/3.23; 358/3.26

(58) Field of Classification Search .......... 358/1.9, 358/2.1, 3.01, 3.21, 3.26–3.27, 3.23, 447–448, 358/462–463; 382/256–258, 260–261, 266, 382/275, 199

See application file for complete search history.

(56) References Cited

U.S. PATENT DOCUMENTS

| 5,548,415 | A | * | 8/1996 | Tanaka et al. ............... 358/462 |
| 2002/0093671 | A1 | * | 7/2002 | Ohno ........................ 358/1.9 |
| 2003/0202195 | A1 | * | 10/2003 | Ito ........................... 358/1.9 |

FOREIGN PATENT DOCUMENTS

| JP | 04065969 A | * | 3/1992 |
| JP | 11-266367 | | 9/1999 |

* cited by examiner

*Primary Examiner*—Scott A. Rogers
(74) *Attorney, Agent, or Firm*—Foley & Lardner LLP

(57) ABSTRACT

An image forming apparatus comprises an edge detection means for detecting an edge in image data, a thinning judgment unit (11) for judging whether or not a thinning process in the image data should be performed, and an edge density conversion unit (12) for receiving a discrimination signal from said thinning judgment unit (11) to perform density conversion of a pixel which is judged to be subject to the thinning process.

9 Claims, 1 Drawing Sheet

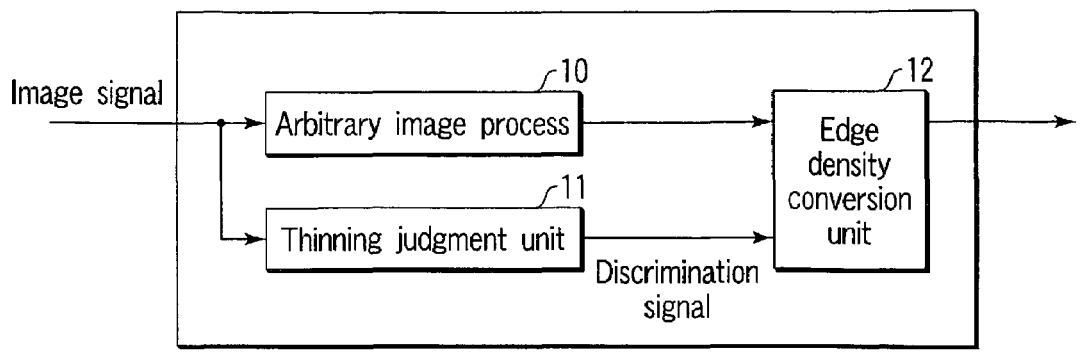
FIG. 1
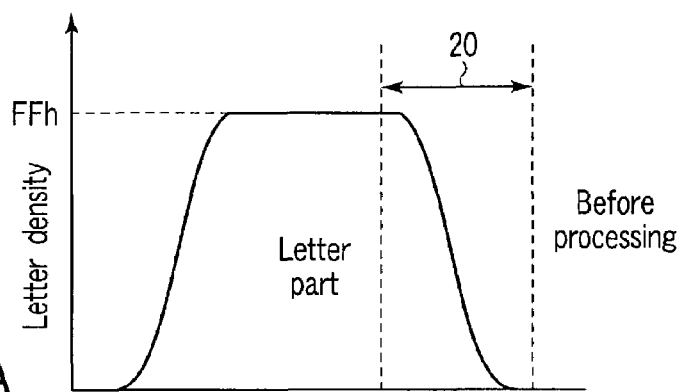
FIG. 2A
FIG. 2B
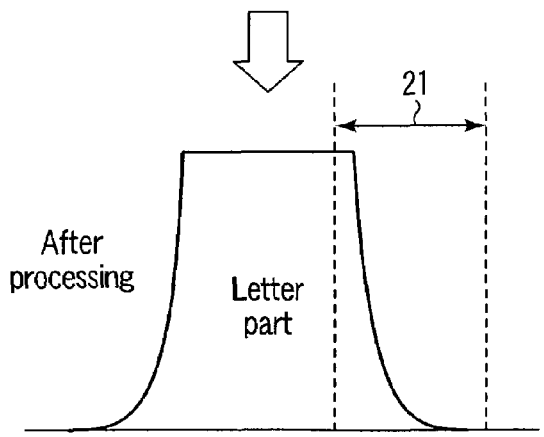
FIG. 3

IMAGE FORMING APPARATUS

BACKGROUND OF THE INVENTION

The present invention relates to an image forming apparatus for inputting an image to convert the input image into image data necessary for image formation, and more specifically, it relates to an image forming apparatus for performing a thinning process.

In a copying machine, printing rate is one of the factors that determine toner consumption per transfer paper. The printing rate is a value that is determined by the total area of printed objects in a copy image of a specific evaluation chart, and it is intimately concerned with the number of dots in an image formed by an image forming unit. Therefore, if the line of each letter or the like can be thinned by image processing, the number of dots in the image can be decreased. It is thus considered that thinning the lines by image processing to decrease the printing rate is effective for reduction of toner consumption.

Heretofore, thinning (line width control) has been performed after pseudo gradation processing such as error diffusion. As a discrimination method between an edge portion and a non-edge portion in an image, a matching process with a template pattern prepared in advance has been performed.

In the above-mentioned prior art, however, since the target is binary image data after the gradation processing, discrimination accuracy is limited, and erroneous discrimination also occurs in places. Therefore, if the degree of thinning is increased, a non-edge portion in a gradated photograph or the like may erroneously be discriminated as an edge portion and in such a case, an undesired influence occurs wherein the pixels in that portion are thinned. There is a problem that the degree of thinning can not sufficiently be increased to avoid such an influence. Besides, such an edge discrimination process by pattern matching requires a large amount of calculation and it is complicated. This causes another problem of an increase in circuit scale.

BRIEF SUMMARY OF THE INVENTION

An object of the present invention is to provide an image forming apparatus in which the discrimination accuracy of edge portions and so the effect of thinning can be increased without degrading the image quality by using, as a target to be processed, multi-value image data before gradation processing, and the hardware construction for the thinning process can be simplified by using a process in which an edge detection process with a filter is combined with the use of a γ conversion table.

An image forming apparatus according to the present invention comprises an edge detection means for detecting an edge in image data, a thinning judgment means for judging whether or not a thinning process in the image data should be performed, and an edge density conversion means for receiving a discrimination signal from the thinning judgment means to perform density conversion of a pixel which is judged to be subject to the thinning process.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram of a general construction according to an embodiment of the present invention;

FIGS. 2A and 2B illustrate a thinning process according to the embodiment of the present invention; and FIG. 3 illustrates an example of a first-order differential filter according to the embodiment of the present invention.

DETAILED DESCRIPTION OF THE INVENTION

Hereinafter, an embodiment of the present invention will be described with reference to the accompanying drawings.

FIG. 1 is a block diagram of a general construction according to an embodiment of the present invention. Referring to FIG. 1, an input image signal is first subjected to an arbitrary image process 10 and then enters an edge density conversion unit 12, where the density of an edge in the input image is converted. However, the above image process may not be performed if it is unnecessary.

The input image signal is sent also to a thinning judgment unit 11, where an edge in the input image is detected by a filtering process. The thinning judgment unit 11 judges a target pixel to constitute an edge when the edge quantity (inclination) calculated in relation to the pixel is not less than a predetermined threshold. After the judgment, the thinning judgment unit 11 sends a discrimination signal (whose value is "1" if a pixel is judged to constitute an edge, or otherwise "0") to the edge density conversion unit 12. In the case that the thinning judgment unit 11 uses a first-order differential filter, the thinning judgment unit 11 performs filtering processes as described above in arbitrary directions of all the four directions, i.e., the main scanning direction, the auxiliary scanning direction, and two oblique directions. The thinning judgment unit 11 then uses, as an edge judgment discrimination signal, the OR value of the judgment results of those directions. FIG. 3 illustrates an example of the first-order differential filter.

In this embodiment, by varying the threshold for edge judgment, the area (pixels) judged to be an edge can be expanded or reduced and thereby the degree of thinning can be controlled. Further, in order to avoid degradation of image quality due to an excessive thinning process, the thinning judgment unit 11 detects a low-frequency area where the thinning judgment unit 11 does not perform the thinning process. This process will be referred to as a thinning control judgment. In the thinning control judgment, the maximum and minimum values in 3×3 pixels of a target pixel and its peripheral eight pixels, and the differential value of them is calculated. The calculated differential value is then compared with a predetermined threshold. When the differential value is smaller than the threshold, the target area is considered a low-frequency (or low MTF) area and the target pixel is judged to be a thinning control target (non-edge) pixel (signal value). The thinning judgment unit 11 uses the AND value of the edge judgment discrimination signal and the thinning control target judgment signal as a final thinning judgment discrimination signal ("1" in case of an edge and "0" in case of a non-edge).

FIGS. 2A and 2B illustrate a thinning process according to the present invention. The edge density conversion unit 12 performs an edge density conversion in accordance with the discrimination signal sent from the thinning judgment unit 11, as illustrated in FIGS. 2A and 2B. In this edge density conversion, a density conversion (in which the output density is lowered) is performed with a lookup table in relation to each pixel in an area 20 judged to be an edge. FIGS. 2A and 2B show states before and after the edge density conversion process, respectively.

In this embodiment, by varying set values in the lookup table, the degree of the thinning process can be controlled. The image signal to be subjected to the edge density conversion may not be the same as the signal input to the thinning judgment unit 11. For example, the target signal may have been subjected to the arbitrary image process 10 such as a smoothing process with an LPF (Low Pass Filter). Conversely, in the case of thickening, the lookup table is set so that the output density may be raised.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image forming apparatus comprising:
   an edge detection means for detecting an edge in image data;
   a thinning judgment means for judging whether or not a thinning process in said image data should be performed; and
   an edge density conversion means for receiving a discrimination signal from said thinning judgment means to perform density conversion of a pixel which is judged to be subject to the thinning process.

2. An apparatus according to claim 1, wherein said edge density conversion means refers to a lookup table.

3. An apparatus according to claim 1, further comprising an edge detection means effected by a filtering process.

4. An apparatus according to claim 1, wherein said edge detection means uses a first-order differential filter for a filtering process.

5. An apparatus according to claim 4, wherein, after said first-order differential filter performs edge detection in four directions of a main scanning direction, an auxiliary scanning direction, and two oblique directions, whether or not the detection result is made effective can be set separately in relation to each of said four directions.

6. An apparatus according to claim 1, wherein said thinning judgment means has a thinning control means for judging a low-frequency area to be an area where thinning should not be performed.

7. An apparatus according to claim 6, wherein said thinning control means obtains the maximum and minimum values of a target pixel and peripheral pixels of said target pixel, and when their differential value is not more than a predetermined threshold, said thinning control means judges the area to be a low-frequency area.

8. An apparatus according to claim 1, comprising a thinning judgment means including said edge detection means and said thinning control means, said thinning judgment means outputting as a thinning judgment discrimination signal whether or not a thinning process should be performed on the basis of the respective judgment results.

9. An apparatus according to claim 1, wherein, in said edge density conversion means, an image to be subjected to edge density conversion has been subjected to an arbitrary process.

* * * * *